(12) United States Patent
Yamaguchi et al.

(10) Patent No.: US 7,547,333 B2
(45) Date of Patent: Jun. 16, 2009

(54) FUEL REFORMING SYSTEM

(75) Inventors: Koichi Yamaguchi, Yokohama (JP);
Takashi Aoyama, Yokohama (JP);
Tadashi Shoji, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 177 days.

(21) Appl. No.: 10/554,906

(22) PCT Filed: Aug. 3, 2004

(86) PCT No.: PCT/JP2004/011421
§ 371 (c)(1),
(2), (4) Date: Oct. 28, 2005

(87) PCT Pub. No.: WO2005/029616
PCT Pub. Date: Mar. 31, 2005

(65) Prior Publication Data
US 2006/0225346 A1  Oct. 12, 2006

(30) Foreign Application Priority Data
Sep. 24, 2003   (JP)  ............................. 2003-332160

(51) Int. Cl.
*B01J 8/00*     (2006.01)
*B01J 7/00*     (2006.01)
*F01N 3/20*     (2006.01)
*B01J 8/04*     (2006.01)
*B01J 19/00*    (2006.01)
*H01M 8/18*     (2006.01)
*F23Q 9/08*     (2006.01)

(52) U.S. Cl. .......................... 48/127.9; 48/61; 422/105; 422/188; 422/191; 422/198; 429/20; 429/24; 429/26; 431/42; 431/60

(58) Field of Classification Search ............... 48/127.9, 48/61; 431/42, 60; 422/105, 188, 198, 191; 429/20, 24, 26
See application file for complete search history.

(56) References Cited

U.S. PATENT DOCUMENTS 6,472,092 B1 * 10/2002 Matsuda et al. ............... 429/17
2002/0155331 A1 * 10/2002 Kamegaya et al. ............ 429/19

FOREIGN PATENT DOCUMENTS

| EP | 1 160 193 A1 | 12/2001 |
|---|---|---|
| EP | 1 203 750 A2 | 5/2002 |
| EP | EP 1 361 193 A1 | 11/2003 |
| JP | 4-177011 A | 6/1992 |
| JP | 09-063619 A | 3/1997 |
| WO | WO 03/042097 A1 | 5/2003 |
| WO | WO 03/066518 A1 | 8/2003 |
| WO | WO 03-101890 A1 | 12/2003 |

OTHER PUBLICATIONS

Patent Abstracts of Japan, vol. 1997, No. 07, Jul. 31, 1997, JP 09-063619, Mar. 7, 1997.

* cited by examiner

*Primary Examiner*—Walter D Griffin
*Assistant Examiner*—Lessanework T Seifu
(74) *Attorney, Agent, or Firm*—Foley & Lardner LLP (57) ABSTRACT

In a fuel reforming system (32) of a fuel cell system (1), which includes a reformer (7) generating hydrogen-containing gas to be an electromotive fuel and a combustor (6) generating combustion gas, the combustor (6) has two combustion parts including a main combustion part (20) and a sub-combustion part (18), a fuel pre-vaporization part (19) between the two combustion parts and a main fuel injection valve (16) and a sub-fuel injection valve (15) which supply the fuel to the respective combustion parts. In start-up of the fuel cell system (1), predetermined amounts of fuel and air for generating heat quantity required in the fuel pre-vaporization part (19) are subjected to lean combustion in the sub-combustion part (18), the fuel to be combusted in the main combustion part (20) is pre-vaporized in the fuel pre-vaporization part (19) by use of the combustion gas from the sub-combustion part (18), and the pre-vaporized fuel obtained by the pre-vaporization and air are subjected to premixed lean combustion in the main combustion part (20).

12 Claims, 10 Drawing Sheets

| | EARLY STAGE OF START-UP | START-UP | OPERATION | TRANSITION (LOAD IS INCREASED) | IDLE OPERATION | STOP |
|---|---|---|---|---|---|---|
| AIR CONTROL VALVE 13 | OPEN | CLOSE | CLOSE | CLOSE | OPEN | CLOSE |
| SUB-FUEL INJECTION VALVE 15 | OPERATION | STOP | STOP | STOP | OPERATION | STOP |
| SUB-COMBUSTION PART 18 | COMBUSTION | STOP | STOP | STOP | COMBUSTION | STOP |
| AIR CONTROL VALVE 14 | OPEN | OPEN | OPEN | CLOSE | CLOSE | OPEN |
| MAIN FUEL INJECTION VALVE 16 | OPERATION | OPERATION | OPERATION | STOP | STOP | OPERATION |
| FUEL PRE-VAPORIZATION PART 19 | PRE-VAPORIZATION | PRE-VAPORIZATION | PRE-VAPORIZATION | STOP | STOP | PRE-VAPORIZATION |
| MAIN COMBUSTION PART 20 | COMBUSTION | COMBUSTION | STOP | STOP | STOP | COMBUSTION |

| | EARLY STAGE OF START-UP | START-UP | OPERATION | TRANSITION (LOAD IS INCREASED) | IDLE OPERATION | STOP |
|---|---|---|---|---|---|---|
| AIR CONTROL VALVE 13 | OPEN | CLOSE | CLOSE | OPEN | OPEN | CLOSE |
| SUB-FUEL INJECTION VALVE 15 | OPERATION | STOP | STOP | OPERATION | OPEN | STOP |
| SUB-COMBUSTION PART 18 | COMBUSTION | STOP | STOP | COMBUSTION | COMBUSTION | STOP |
| AIR CONTROL VALVE 14 | OPEN | OPEN | OPEN | OPEN | CLOSE | OPEN |
| MAIN FUEL INJECTION VALVE 16 | OPERATION | OPERATION | OPERATION | OPERATION | STOP | OPERATION |
| FUEL PRE-VAPORIZATION PART 19 | PRE-VAPORIZATION | PRE-VAPORIZATION | PRE-VAPORIZATION | PRE-VAPORIZATION | STOP | PRE-VAPORIZATION |
| MAIN COMBUSTION PART / REFORMER 20a | COMBUSTION | COMBUSTION | REFORMING | REFORMING | STOP | COMBUSTION |

FIG. 13

FIG. 14A  HEAT EXCHANGER EFFICIENCY

FIG. 14B  AIR AMOUNT FOR REFORMING

FUEL REFORMING SYSTEM

TECHNICAL FIELD

The present invention relates to a fuel cell system, and more particularly to a fuel reforming system of a fuel cell system in which exhaust performance, start-up performance, stopping performance, transient response and the like are improved.

BACKGROUND ART

A fuel cell which generates power by utilizing an electrochemical reaction between hydrogen rich gas and oxygen-containing gas such as air has been heretofore known. In the fuel cell, usually, air is used as the oxygen-containing gas and reformed gas is used as hydrogen-containing gas, the reformed gas being obtained by a reforming reaction which generates hydrogen and carbon dioxide by use of a hydrocarbon fuel (for example, gasoline), water and oxygen. A fuel reforming device which performs the reforming reaction includes a plurality of components such as: a fuel reformer using any one of or both of a steam reaction and a partial oxidation reaction; a shift reactor which reduces a concentration of carbon monoxide in the reformed gas by a shift reaction; a selective oxidation reactor which reduces the concentration of carbon monoxide in the reformed gas by a selective oxidation reaction; and a heat exchanger which is provided between the reactors and maintains a proper temperature of reformed gas.

In order to adopt a fuel cell system in a vehicle drive power source, shortening of start-up time is one of problems to be solved. Particularly, it is a problem how quickly the respective components of the fuel reforming device can be heated to a temperature suitable for reactions to generate hydrogen rich gas.

As a conventional method for heating the fuel reforming device, there is a technology of heating the respective components of the fuel reforming device by supplying a fuel and air to a combustor in start-up for combustion thereof and distributing obtained combustion gas within the fuel reforming device. However, when a hydrocarbon fuel that is a liquid at room temperature, such as gasoline, is used as the fuel, there occurs diffusion combustion if the fuel is combusted by being injected into air in the combustor. Thus, there was a problem that high-concentration nitrogen oxide (NOx) is generated in the combustion gas. For a problem similar to the above, as a technology of reducing emissions in general combustors, there is a technology of performing premixed lean combustion by pre-vaporizing a liquid fuel, premixing the liquid fuel with air at a rate of excess air and supplying the mixture to the combustor.

For example, there has been known a technology in which combustion gas obtained by performing combustion at a mixing ratio close to a theoretical mixing ratio (theoretical air-fuel ratio) in a sub-combustion part is mixed with air, high-temperature gas, of which temperature is lowered below a ignition temperature of a liquid fuel, is generated, the high-temperature gas is mixed with the liquid fuel to be pre-vaporized and the mixture is supplied to a main combustion part in a subsequent stage in order to perform premixed lean combustion (see Japanese Patent Application Laid-Open No. H4-177011).

DISCLOSURE OF INVENTION

Figure 4:
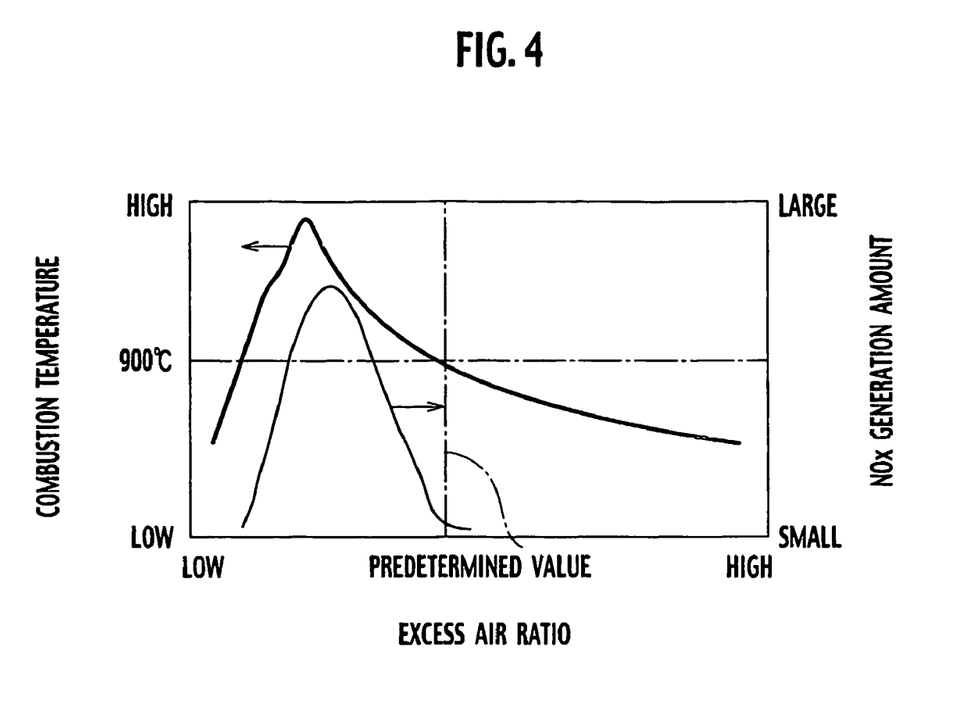
FIG. 4 is a graph showing a relationship between an excess air ratio, a combustion temperature and a nitrogen oxide generation amount in the combustor.

In the technology described in the foregoing Japanese Patent Application Laid-Open No. H4-177011, a temperature of the combustion gas in the sub-combustion part is set to 1200 to 2000° C. In general, it is known that there is a relationship as shown in FIG. 4 between an excess air ratio, a combustion temperature and a NOx generation amount. In FIG. 4, a graph with a left arrow shows characteristics of the combustion temperature and a graph with a right arrow shows characteristics of the NOx generation amount.

In the technology described in Japanese Patent Application Laid-Open No. H4-177011, although NOx can be reduced by the premixed lean combustion in the main combustion part, the air-fuel ratio in the sub-combustion part is set close to the theoretical mixing ratio. Thus, a large amount of NOx is generated in the sub-combustion part. Consequently, the amount of NOx generated in the sub-combustion part makes up most of the amount of NOx emitted from the combustor. As described above, by use of the technology of reducing emissions, which is described in Japanese Patent Application Laid-Open No. H4-177011, it is difficult to reduce NOx in the sub-combustion part. Thus, there was a problem that a sufficient effect of reducing NOx emissions could not be obtained in the entire combustor.

The present invention has been accomplished to solve the above problem, and it is an object of the present invention to provide a fuel reforming system of a fuel cell system in which exhaust performance, start-up performance, stopping performance, transient response and the like are improved.

According to one aspect of the present invention, there is provided a fuel reforming system of a fuel cell system comprising: a fuel reforming device including a fuel reformer which generates hydrogen-containing gas; and a combustor including a main combustion part, a sub-combustion part, a fuel pre-vaporization part between the main combustion part and the sub-combustion part, a main fuel injection valve which supplies a liquid fuel to the main combustion part, and a sub-fuel injection valve which supplies the fuel to the sub-combustion part, wherein, when the fuel cell system starts, predetermined amounts of the fuel and air for generating heat required in the fuel pre-vaporization part are subjected to lean combustion in the sub-combustion part, the fuel to be combusted in the main combustion part is pre-vaporized in the fuel pre-vaporization part by use of combustion gas generated by the lean combustion in the sub-combustion part, air and the pre-vaporized fuel obtained by the pre-vaporization in the fuel pre-vaporization part are subjected to premixed lean combustion in the main combustion part, and combustion gas generated by the premixed lean combustion in the main combustion part heats the fuel reforming device.

BEST MODE FOR CARRYING OUT THE INVENTION

Embodiments of the present invention will be explained below with reference to the drawings, wherein like numbers are designated by like reference characters.

Embodiment 1

Figure 1:
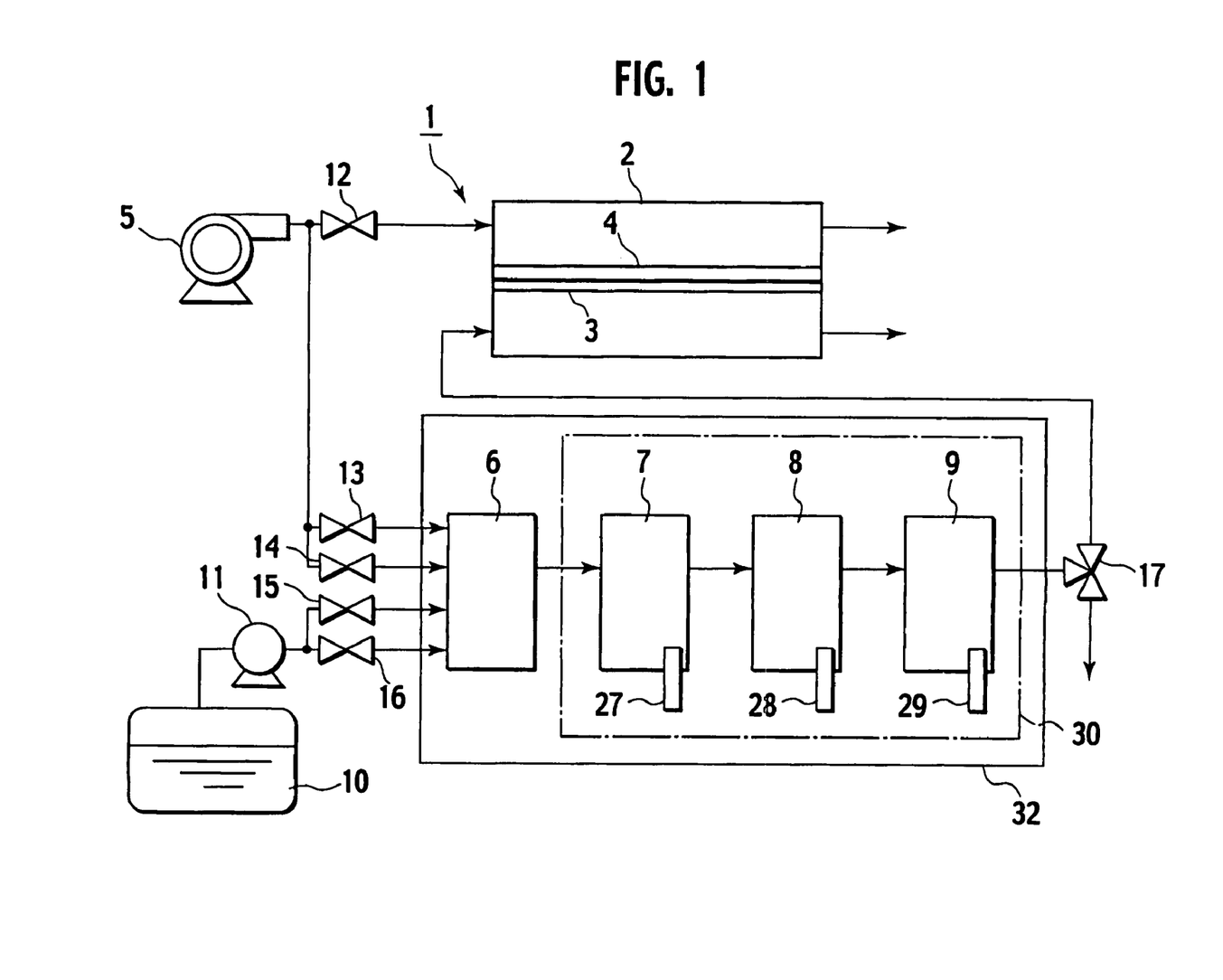
FIG. 1 is a block diagram showing one example of a fuel cell system according to embodiment 1.

First, a fuel cell system to which a fuel reforming system according to embodiment 1 is applied will be schematically described. FIG. 1 shows an example of the fuel cell system according to embodiment 1.

The fuel cell system 1 includes: a fuel cell stack 2 which obtains an electromotive force by an electrochemical reaction; a compressor 5 which supplies compressed air (oxygen-containing gas); a fuel reforming system 32; and other constituent components shown in the drawing. The fuel reforming system 32 includes a combustor 6 which supplies combustion gas to a fuel reforming device 30 in start-up, and the fuel reforming device 30 which generates hydrogen-containing gas to be an electromotive fuel by a reforming reaction.

A hydrocarbon fuel (for example, gasoline) and water, as reforming raw materials, are stored in a fuel tank 10 and a water tank (not shown) and sent to the fuel reforming system 32 by a fuel pump 11 and a water pump (not shown).

The fuel reforming device 30 includes: a fuel reformer 7; a shift reactor 8; and a selective oxidation reactor 9. The reformer 7 mixes together the fuel, water and air supplied from the compressor, and generates hydrogen rich gas by a steam reforming reaction of the fuel and an oxidation reaction thereof. In this embodiment, heat required for the steam reforming reaction that is an endothermic reaction is covered by heat generated by the oxidation reaction that is an exothermic reaction. Thus, an autothermal type capable of omitting an additional heater or reducing the capacity is adopted. In order to prevent poisoning of the fuel cell stack 2 by carbon monoxide contained in the reformed gas supplied to a fuel electrode 3 side of the fuel cell stack 2 from the reformer 7, the shift reactor 8 which reduces a concentration of carbon monoxide by a shift reaction and the selective oxidation reactor 9 which reduces carbon monoxide by a selective oxidation reaction are disposed between the reformer 7 and the fuel cell stack 2.

The compressed air from the compressor 5 is supplied to an air electrode 4 side of the fuel cell stack 2 and the reformed gas from the fuel reforming device 30 is supplied to the fuel electrode 3 side thereof. Thus, power generation is performed by utilizing electrochemical reactions.

In start-up of the fuel cell system, the fuel and the air are sent to the combustor 6 to perform lean combustion. The reformer 7, the shift reactor 8 and the selective oxidation reactor 9 are heated by distributing the combustion gas therethrough.

Figure 2:
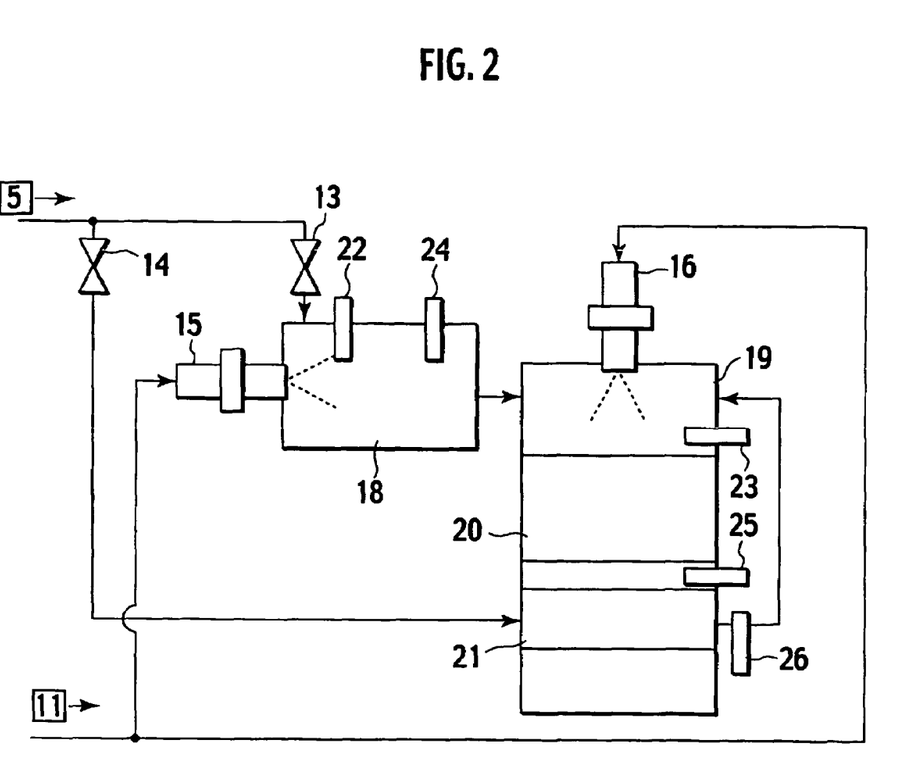
FIG. 2 is a block diagram showing a detailed configuration of a combustor according to embodiment 1.

First, the fuel reforming system 32 according to embodiment 1 will be described. FIG. 2 shows a detailed configuration of the combustor 6 according to embodiment 1. The combustor 6 has: two combustion parts including a sub-combustion part 18 and a main combustion part 20; a fuel pre-vaporization part 19 between the two combustion parts; a sub-fuel injection valve 15 and a main fuel injection valve 16 which supply the fuel to the respective combustion parts; air control valves 13 and 14 which supply air to the respective combustion parts; and a heat exchanger 21. Here, the sub-fuel injection valve 15 is formed by use of an injection valve having a flow rate lower than that of the main fuel injection valve 16. Moreover, to the respective parts of the combustor 6, glow plugs (or spark plugs) 22 and 23, combustion gas temperature sensors 24 and 25 and an outlet gas temperature sensor 26 from the heat exchanger 21 are connected.

Note that a reformer temperature sensor 27, a shift reactor temperature sensor 28 and a selective oxidation reactor temperature sensor 29 are connected to the respective parts of the fuel reforming device 30, as shown in FIG. 1. Hereinafter these sensors are accordingly referred to as temperature sensors.

Moreover, an electronic control device (not shown) of the fuel cell system 1 has a built-in microcomputer. To the microcomputer, temperature signals from the fuel gas temperature sensors 24 and 25, the outlet gas temperature sensor 26, the respective temperature sensors 27 to 29 and signals from unillustrated throttle sensor and speed sensor are inputted. Based on these input signals, the electronic control device controls operations of the compressor 5, the fuel pump 11, the air control valves 13 and 14, the fuel injection valves 15 and 16, the glow plugs 22 and 23 and the like by use of programs of the microcomputer.

Figure 3:
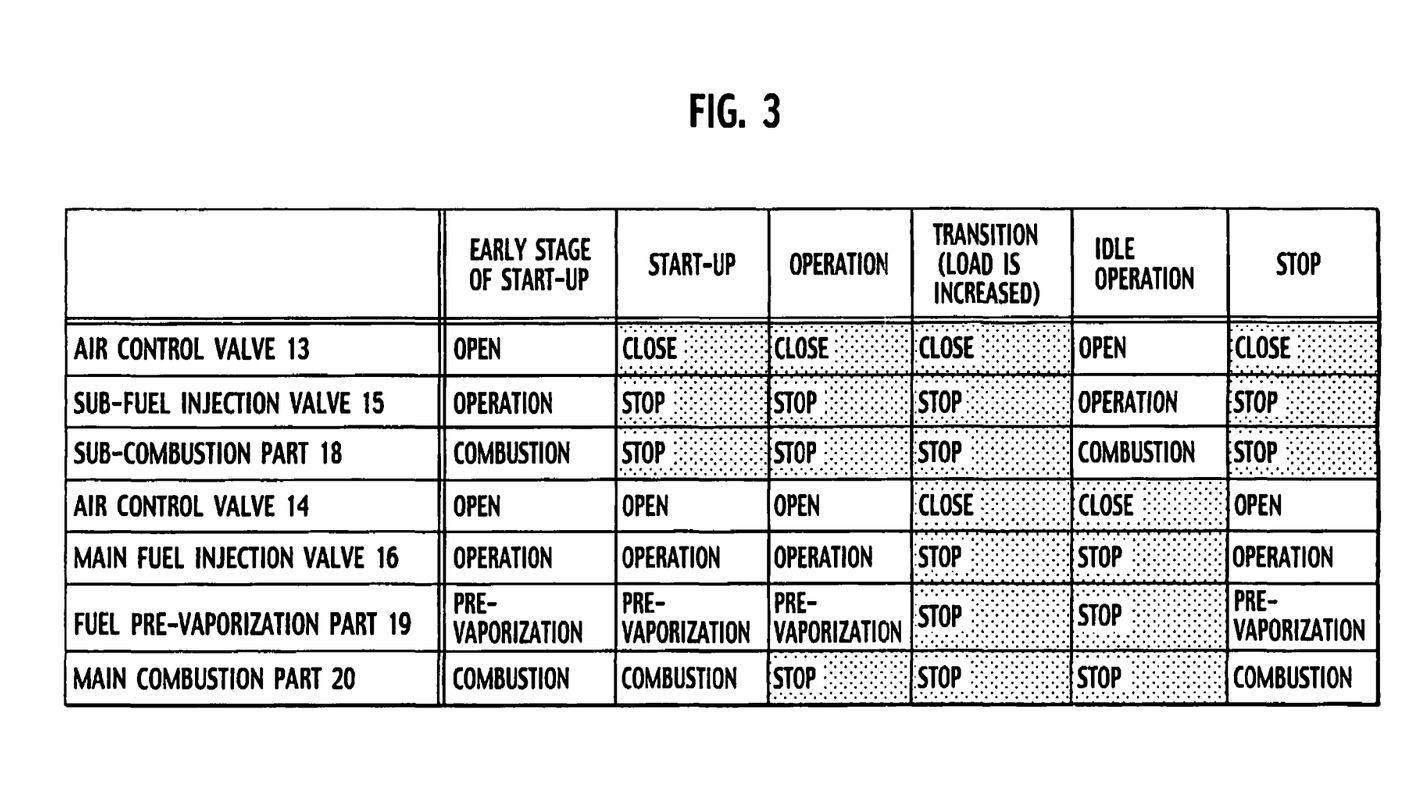
FIG. 3 is an explanatory view showing operations of respective parts of the combustor according to operational states of a fuel reforming device in embodiment 1.

Next, Operations of the fuel reforming system according to embodiment 1 will be described. FIG. 3 shows operations of the respective parts of the combustor according to operational states of the fuel reforming device in this embodiment.

Figure 5:
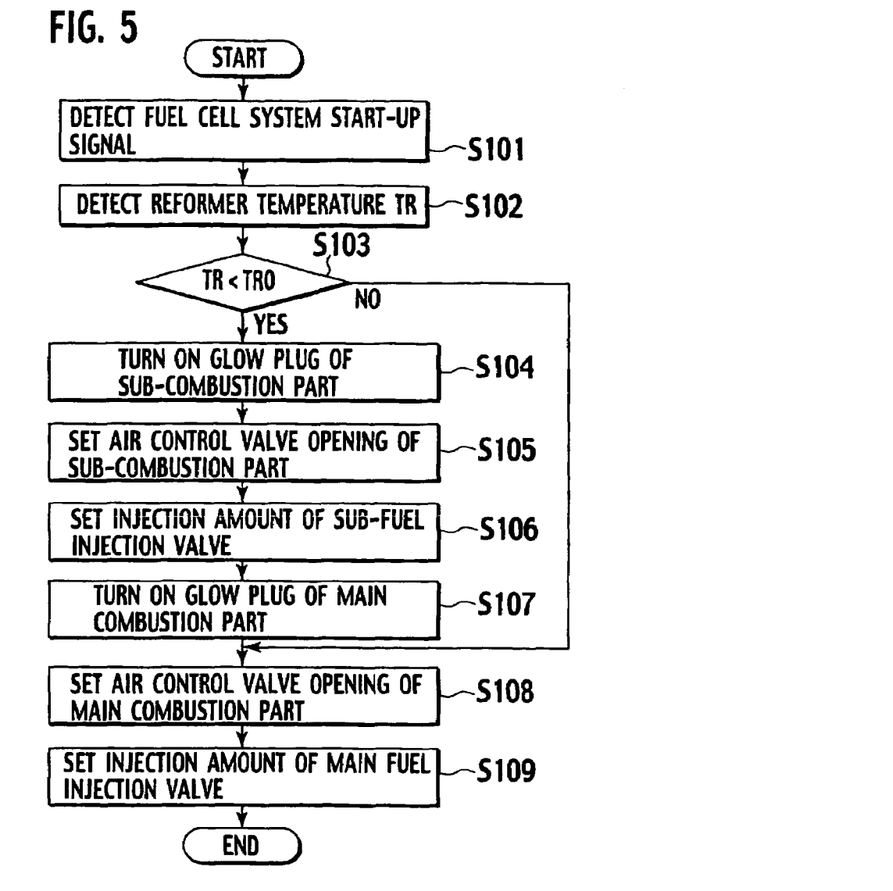
FIG. 5 is a flowchart showing operations of embodiment 1 in an early stage of start-up of a fuel reforming system.

FIG. 5 is a flowchart showing operations of embodiment 1 in an early stage of start-up of the fuel reforming system. Note that, in FIG. 5, the order of the operations in the flowchart is partially different from that described below.

Upon detecting a start-up signal of the fuel cell system 1 (Step S101), the electronic control device detects a reformer temperature TR from the temperature sensor 27 shown in FIG. 2 (Step S102) and determines whether or not this reformer temperature TR is lower than a predetermined temperature TR0 (Step S103). Here, if YES, combustion is started to heat the fuel reforming device 30 according to the following procedures. First, air and a fuel, of which amounts are adjusted by the air control valve 13 and the sub-fuel injection valve 15, are supplied to the sub-combustion part 18 and are ignited by turning on the glow plug 22 to perform lean combustion (Steps S104 to S106). The fuel amount in this event is determined from heat required in the fuel pre-vaporization part 19, that is, heat required for pre-vaporizing the fuel to be combusted in the main combustion part 20. In other words, the fuel amount of this event is determined from the amount of the pre-vaporized fuel with a proportional relation thereto. Moreover, based on a relationship shown in FIG. 4 between an excess air ratio, a combustion temperature and a NOx generation amount, the amount of air is determined from the excess air ratio at which the NOx generation amount or the combustion temperature related to the NOx generation amount is below a predetermined allowable range. Subsequently, combustion gas from the sub-combustion part 18 is supplied to the fuel pre-vaporization part 19, a fuel, of which amount is adjusted by the main fuel injection valve 16, is injected into the combustion gas, the fuel is pre-vaporized, air controlled by the air control valve 14 is introduced and thus premixed air is generated. An excess air ratio in this event is determined similarly to that in the sub-combustion part 18. The lean premixed air thus generated is ignited by turning on a glow plug 23 in the main combustion part 20 and premixed lean combustion is performed (Steps S107 to S109). The combustion gas thus generated is distributed within the fuel reforming device 30 and the parts therein are heated. Note that if Step S103 is NO, the procedures after Step S108 are carried out.

As described above, in start-up of the fuel cell system, the lean combustion is performed by supplying to the sub-combustion part 18 a predetermined amount of fuel which generates heat required in the fuel pre-vaporization part 19 and air which has a predetermined excess air ratio to this fuel. In this event, the predetermined amount of fuel is determined from heat required to pre-vaporize the fuel combusted in the main combustion part 20. In other words, the predetermined amount of fuel is determined from the amount of pre-vaporized fuel with a proportional relation thereto. Moreover, the predetermined excess air ratio is determined in such a manner that the NOx generation amount or the combustion temperature related to the NOx generation amount is below the predetermined allowable range. Generally, the NOx generation amount becomes extremely small at the combustion temperature of 900° C. or less. By combusting the fuel as described above, the NOx generation amount in the sub-combustion part 18 can be sufficiently reduced. Thereafter, the fuel combusted in the main combustion part 20 is pre-vaporized in the fuel pre-vaporization part 19 by use of the combustion gas from the sub-combustion part 18, the pre-vaporized fuel and air are mixed at a predetermined excess air ratio and the premixed lean combustion is performed in the main combustion part 20. By combusting the fuel as described above, the NOx generation amount becomes extremely small in the main combustion part 20. As a result, NOx emissions from the combustor 6 as a total amount of NOx generated in the sub-combustion part 18 and the main combustion part 20 can be greatly reduced. Moreover, by distributing the high-temperature combustion gas thus generated within the fuel reforming device, smooth start-up of the fuel reforming device 30 can be realized.

Moreover, the formation of the sub-fuel injection valve 15 by use of an injection valve having a flow rate lower than that of the main fuel injection valve 16 brings about an effect as below. Specifically, the fuel amount supplied from the sub-fuel injection valve 15 is an amount required to vaporize the fuel supplied from the main fuel injection valve 16 and is set much lower than the supplied amount from the main fuel injection valve 16. In this event, it is not preferable to form the main fuel injection valve 16 and the sub-fuel injection valve 15 by use of injection valves having the same flow rate. This is because, when injection amount control by use of an intermittent injection duty that is a simple method as fuel flow rate control in accordance with load is applied, an operation of the sub-fuel injection valve 15 becomes an extremely low duty and intermittent combustion in the sub-combustion part 18 occurs. Thus, by forming the sub-fuel injection valve 15 to have a lower flow rate than the main fuel injection valve 16, the above-described problem can be avoided and the fuel flow rate control can be performed by simple duty control.

Figure 6:
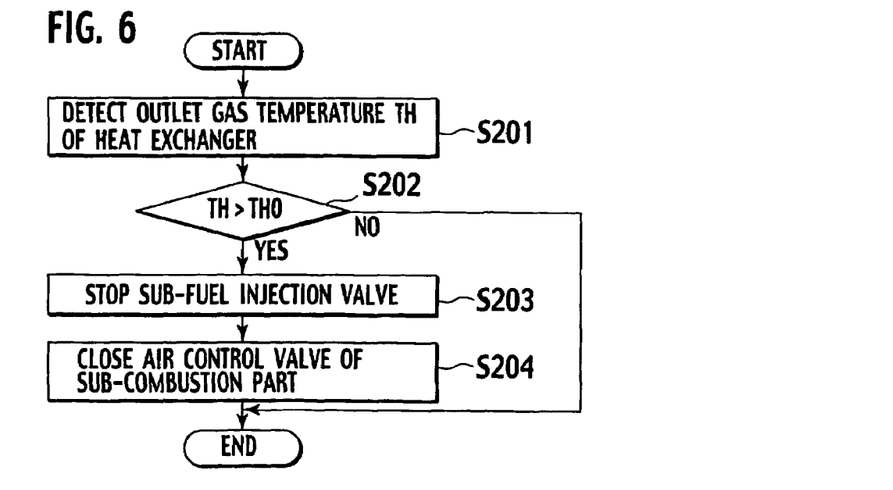
FIG. 6 is a flowchart showing the operations of embodiment 1 after starting combustion in a main combustion part.

Next, after starting the combustion in the main combustion part 20, air preheated by the heat exchanger 21 provided in a downstream of the main combustion part 20 is introduced into the fuel pre-vaporization part 19. FIG. 6 is a flowchart showing the operation of embodiment 1 after starting the combustion in the main combustion part 20.

The electronic control device detects an outlet gas temperature TH of the heat exchanger from the outlet gas temperature sensor 26 shown in FIG. 2 (Step S201) and determines whether or not this outlet gas temperature TH is higher than the predetermined temperature TH0 (Step S202). Here, if YES, the operation of the sub-fuel injection valve 15 is stopped (Step S203), the air control valve 13 is closed (Step S204) and the combustion in the sub-combustion part 18 is stopped. Thereafter, premixed air is generated by using high-temperature air preheated by the heat exchanger 21, in stead of the combustion gas from the sub-combustion part 18, and the premixed lean combustion is continuously performed in the main combustion part 20.

As described above, after starting the combustion in the main combustion part 20, the fuel combusted in the main combustion part 20 can be pre-vaporized by introducing the high-temperature air, which is preheated by the heat exchanger 21 provided in the downstream of the main combustion part 20, into the fuel pre-vaporization part 19, and the combustion in the sub-combustion part 18 can be stopped. Specifically, in the sub-combustion part 18 in which most of the NOx emissions from the combustor 6 are generated, it is possible to eliminate NOx generation after starting the combustion in the main combustion part 20 and thus an effect of significantly reducing NOx is obtained.

Figure 7:
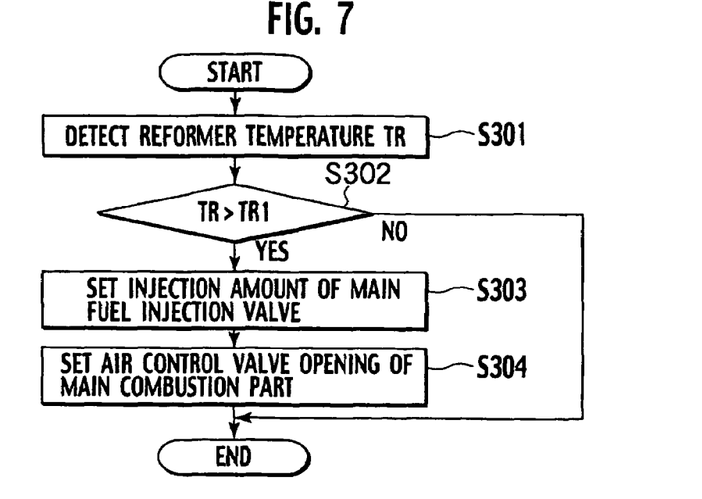
FIG. 7 is a flowchart showing the operations of embodiment 1 in a reforming operation after start-up of the fuel cell system.

Next, after heating the fuel reforming device 30, the combustion in the main combustion part 20 is stopped and the processing moves to a fuel reforming operation as described below. In this embodiment, the main fuel injection valve 16 is configured to operate as an injection valve supplying the fuel to the reformer 7 and to perform pre-vaporization of the fuel by use of the air preheated by the heat exchanger 21. FIG. 7 is a flowchart showing the operation of embodiment 1 in the reforming operation after the start-up of the fuel cell system.

The electronic control device detects a reformer temperature TR from the temperature sensor 27 shown in FIG. 2 (Step S301) and determines whether or not this reformer temperature TR is higher than a predetermined temperature TR1 (Step S302). Here, if YES, the fuel, of which amount is controlled by the main fuel injection valve 16, is supplied (Step S303), an amount of air to be an excess fuel is controlled by the air control valve 14 and the air is supplied to the fuel pre-vaporization part 19 (Step S304). Thereafter, the formed air-fuel mixture of the excess fuel is introduced into the reformer 7. Here, temperatures of the shift reactor 8 and the selective oxidation reactor 9 may be detected to switch the operation.

As described above, the main fuel injection valve 16 is operated as the injection valve supplying the fuel to the reformer 7 in the fuel reforming operation. Thus, the both injection valves can be shared and the number of parts can be reduced.

Note that the fuel may be pre-vaporized in the fuel pre-vaporization part 19 by use of the combustion gas from the sub-combustion part 18. Specifically, when a liquid fuel is used as the fuel, it is preferable to pre-vaporize the liquid fuel and supply the pre-vaporized fuel to the reformer. However, with the configuration as described above, the fuel can be pre-vaporized by use of the combustion gas from the sub-combustion part 18. Thus, it is not required to provide an additional fuel pre-evaporator for the reforming operation and the number of parts can be significantly reduced.

Figure 8:
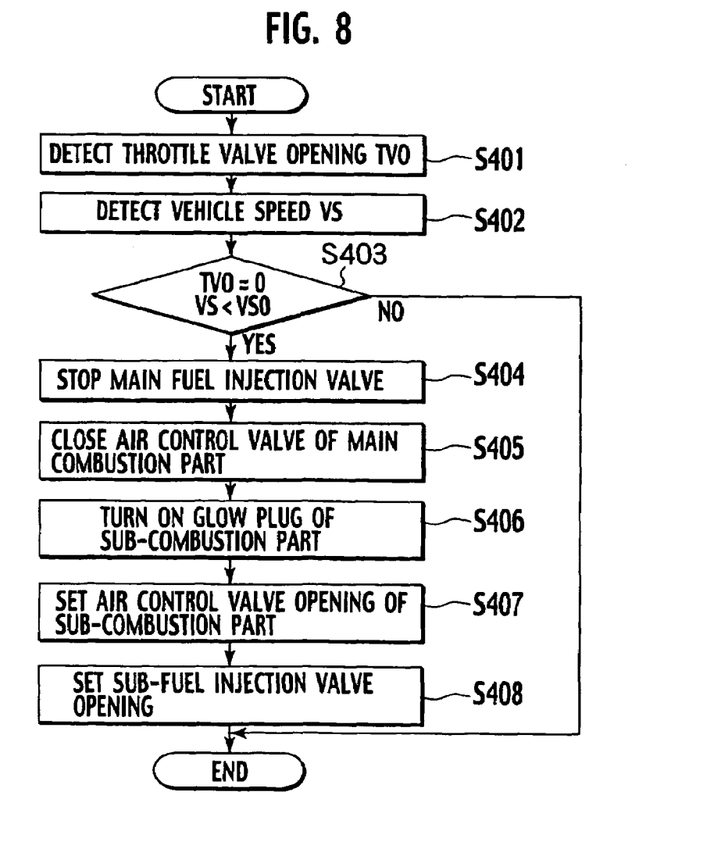
FIG. 8 is a flowchart showing the operations of embodiment 1 in an idle operation.

Next, description will be given of an idle operation which performs heat retention of the fuel reforming device 30 by temporarily stopping the fuel reforming operation to prepare for the next fuel reforming operation. FIG. 8 is a flowchart showing the operations of embodiment 1 in the idle operation. Note that, in FIG. 8, the order of the operations in the flowchart is partially different from that described below.

The electronic control device detects a throttle valve opening TVO and a vehicle speed VS (Steps S401 and S402) and determines whether or not this throttle valve opening TVO is 0 and the vehicle speed VS is lower than a predetermined vehicle speed VS0 (Step S403). Here, if YES, the operation of the main fuel injection valve 16 is stopped (Step S404), the air control valve 14 is closed and the combustion in the main combustion part 20 is stopped (Step S405). Thereafter, the air and the fuel, of which amounts are controlled by the air control valve 13 and the sub-fuel injection valve 15, are supplied to the sub-combustion part 18 and are ignited by use of the glow plug 22 to perform the lean combustion thereof (Steps S406 to S408). The amount of fuel in this event is determined from heat required for heat retention of the fuel reforming device 30. Moreover, the amount of air is determined to have a predetermined excess air ratio similarly to the start-up.

As described above, in the idle operation which performs the heat retention of the fuel reforming device 30 by temporarily stopping the fuel reforming operation to prepare for the next fuel reforming operation after the start-up of the fuel cell system, a necessary calorific value in the combustor 6 is significantly lower than that in the start-up and is sometimes below a combustion intensity range in the main combustion part 20. However, in this case, the combustion is performed only in the sub-combustion part 18 and the combustion gas is distributed in the device. Thus, the heat retention of the fuel reforming device 30 can be performed.

Figure 9:
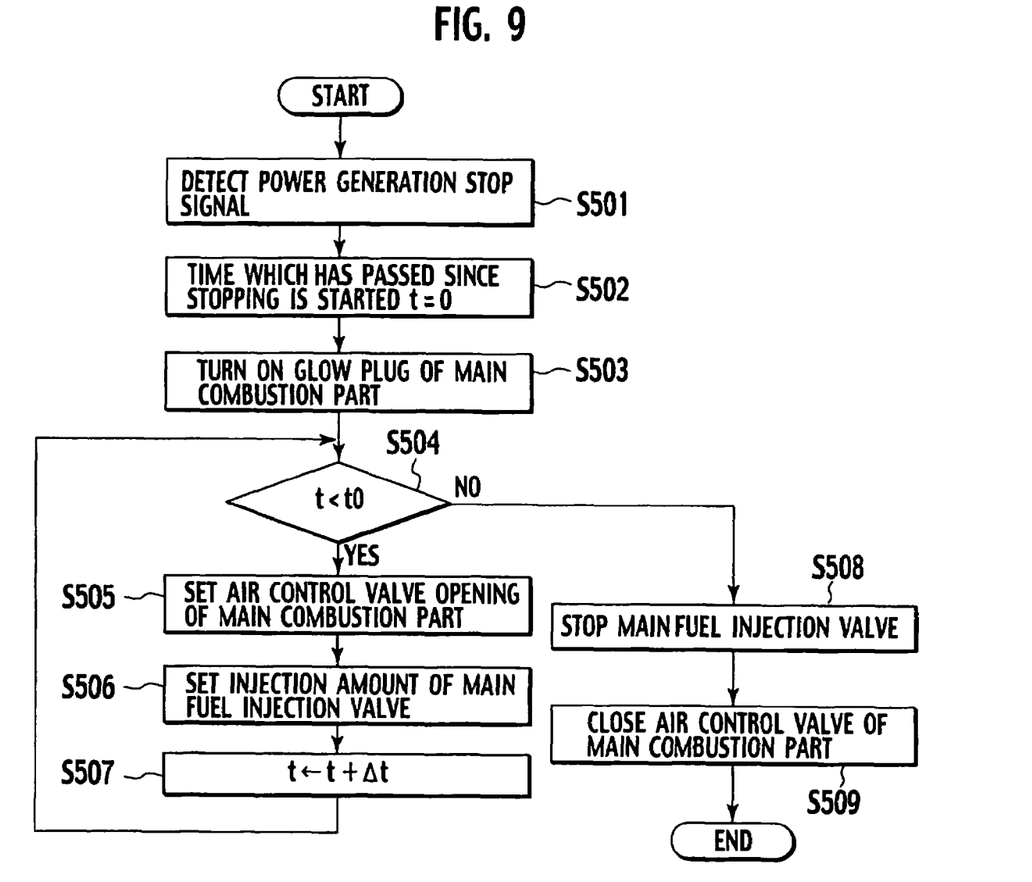
FIG. 9 is a flowchart showing the operations of embodiment 1 when a power generation of a fuel cell is stopped.

Next, when a power generation of a fuel cell is stopped, the lean combustion is performed in the combustor 6 as described below and, by use of the generated high-temperature combustion gas, the fuel reforming device 30 is purged. FIG. 9 is a flowchart showing the operations of embodiment 1 when the power generation of the fuel cell is stopped. Note that, in FIG. 9, the order of the operations in the flowchart is partially different from that described below.

The electronic control device detects a stop signal of the fuel cell system 1 (Step S501) and enters a stopping operation. Time, which has passed since the stopping is started, t is set to 0 (Step S502), and the fuel having its amount controlled by the main fuel injection valve 16 is injected into the high-temperature air introduced to the fuel pre-vaporization part 19 by the heat exchanger 21 (Steps S505 and S506). Thereafter, the fuel is pre-vaporized to generate premixed air and the premixed air is ignited by use of the glow plug in the main combustion part 20 to perform the premixed lean combustion (Step S503). Subsequently, t is set to t+Δt (Step S507) and the operations of Steps S505 to S507 are continued until t reaches a predetermined purge time t0. After the predetermined purge time t0 has passed (NO in Step S504), the operation of the main fuel injection valve 16 is stopped (Step S508), the air control valve 14 is closed (Step S509) and the stopping operation is completed. In this event, the air control valve 14 and the main fuel injection valve 16 may be controlled so as to have the amounts of air and fuel gradually decrease in accordance with the time which has passed since the stopping operation is started, and thus a purge gas amount may be controlled to gradually decrease.

As described above, when the power generation of the fuel cell is stopped, the liquid fuel and the air are supplied to the combustor 6 to perform the lean combustion and the fuel reforming device 30 is purged by use of the generated high-temperature combustion gas. Thus, secure stopping is possible to remove the residual fuel. Moreover, water condensation after stopping the power generation can be prevented to remove the residual water vapor and it is possible to prevent start-up time of the next start-up from being delayed by the condensed water. Moreover, the NOx emissions in this event can be significantly reduced.

Embodiment 2

Figure 10:
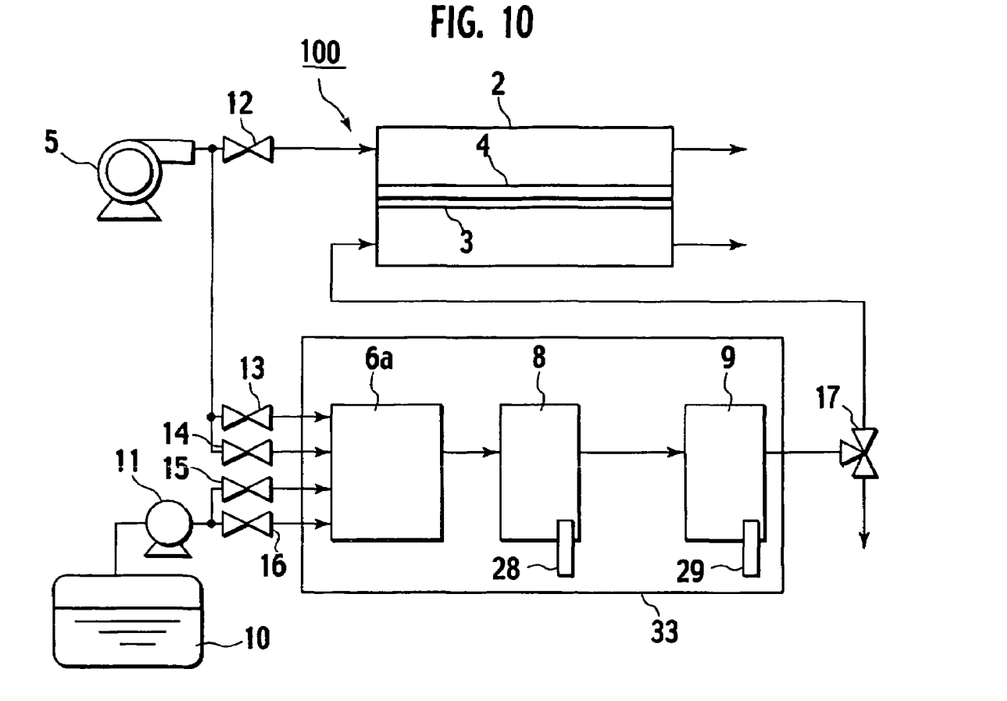
FIG. 10 is a block diagram showing an example of a fuel cell system according to embodiment 2.

Next, a fuel reforming system according to embodiment 2 will be described. FIG. 10 is a block diagram showing an example of a fuel cell system 100 to which the fuel reforming system 33 according to embodiment 2 is applied.

Figure 11:
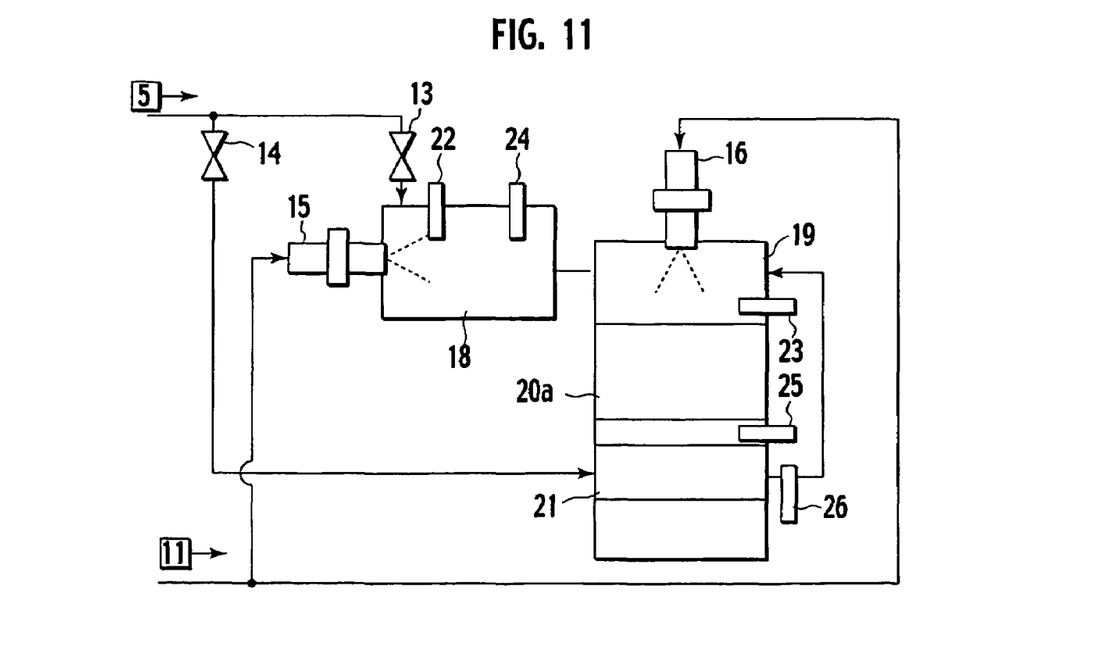
FIG. 11 is a block diagram showing a detailed configuration of a combustor according to embodiment 2.
Figure 12:
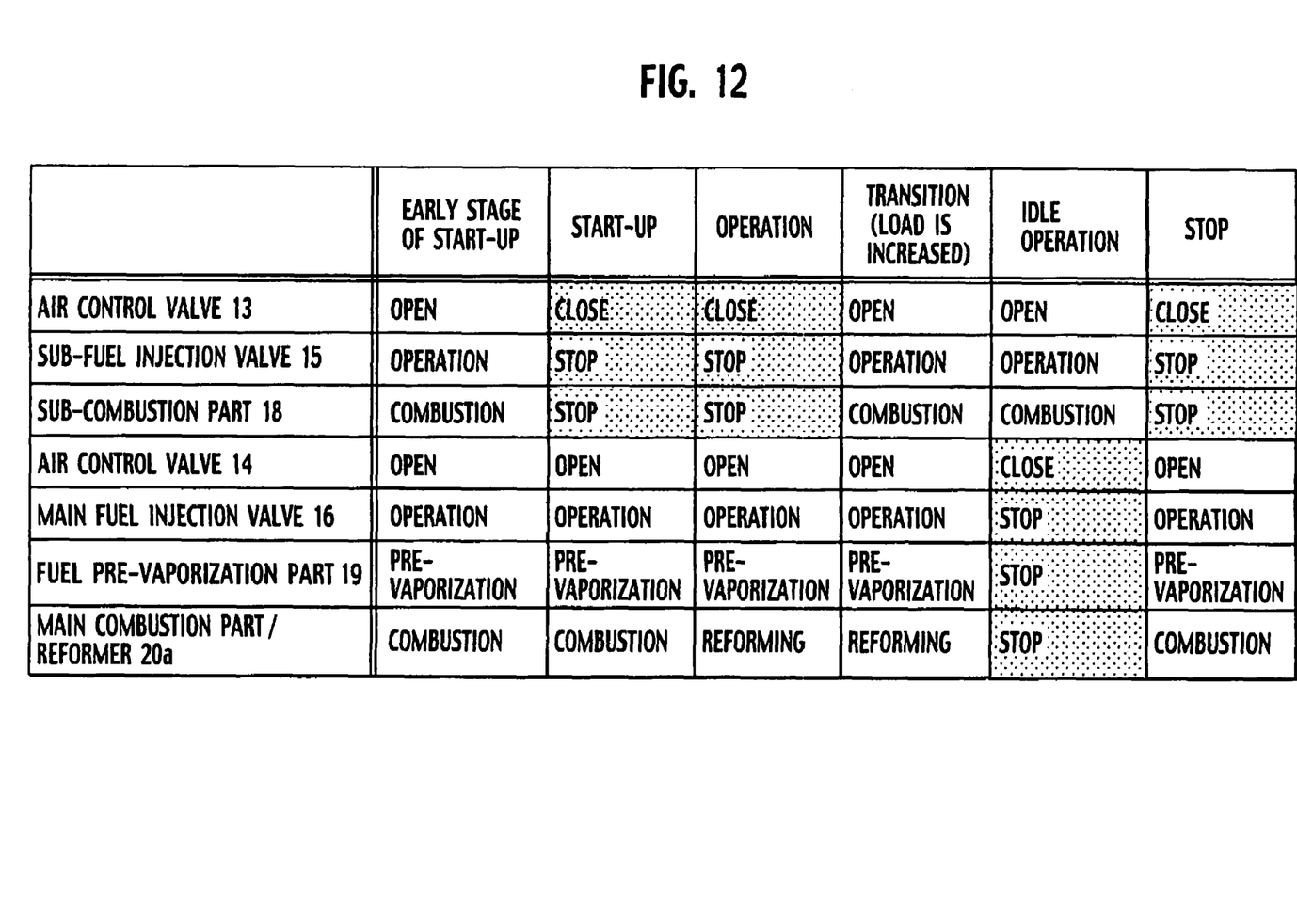
FIG. 12 is an explanatory view showing operations of respective parts of the combustor according to operational states of a fuel reforming device according to embodiment 2.

This embodiment is different from embodiment 1 in that the combustor 6a combines with the reformer. Other components are the same as those of FIG. 1 according to embodiment 1 and the same parts are denoted by the same reference numerals. FIG. 11 shows a detailed configuration of the combustor 6a. As shown in FIG. 11, the combustor 6a includes a main combustion part 20a as a catalyst combustion part, and operates the main combustion part 20a, as the reformer, in its excess fuel state in a reforming operation. The catalyst combustion part has a catalyst which is capable of combusting the fuel in an excess air state and is capable of reforming the fuel in the excess fuel state. Other components are the same as those of FIG. 2 according to embodiment 1 and the same parts are denoted by the same reference numerals. FIG. 12 shows operations of the respective parts of the combustor according to operational states of the fuel reforming device in this embodiment.

As the description of embodiment 2, only a fuel reforming operation, which is different from embodiment 1, will be described below.

In the fuel reforming operation, air preheated by the heat exchanger 21 is controlled for its amount to be an excess fuel by the air control valve 14, and introduced into the fuel pre-vaporization part 19. Moreover, a fuel having its amount controlled by the main fuel injection valve 16 is supplied to the fuel pre-vaporization part 19 and the fuel is pre-vaporized by use of the high-temperature air. Thereafter, the formed air-fuel mixture of the excess fuel is introduced into the main combustion part 20a which combines with the catalyst combustion part, and fuel reforming is performed.

As described above, the main combustion part 20a is configured as the catalyst combustion part and is operated as the reformer in its excess fuel state in the fuel reforming operation. Thus, as the combustor 6a, the number of parts provided in the fuel reforming device can be reduced. Moreover, as a result, the number of parts required to be heated in the start-up of the fuel cell system is reduced and thus stopping time can be shortened. Furthermore, along with shortening of the start-up time and the stopping time, time of operating the combustor is shortened. Thus, the NOx emissions can be significantly reduced.

Moreover, the fuel is vaporized by use of the air preheated by the heat exchanger 21 provided in the downstream of the main combustion part 20a. Thus, the combustion in the main combustion part 20a can be stopped. Therefore, NOx generation from the combustor in the combustion operation can be eliminated.

Note that the fuel may be pre-vaporized in the fuel pre-vaporization part 19 by use of the combustion gas from the sub-combustion part 18. Specifically, when a liquid fuel is used as the fuel, it is preferable to pre-vaporize the liquid fuel and supply the pre-vaporized fuel to the reformer. However, according to the above-described configuration, the fuel can be pre-vaporized by use of the combustion gas from the sub-combustion part 18. Thus, it is not required to provide an additional fuel pre-evaporator for the reforming operation and the number of parts can be significantly reduced.

Figure 13:
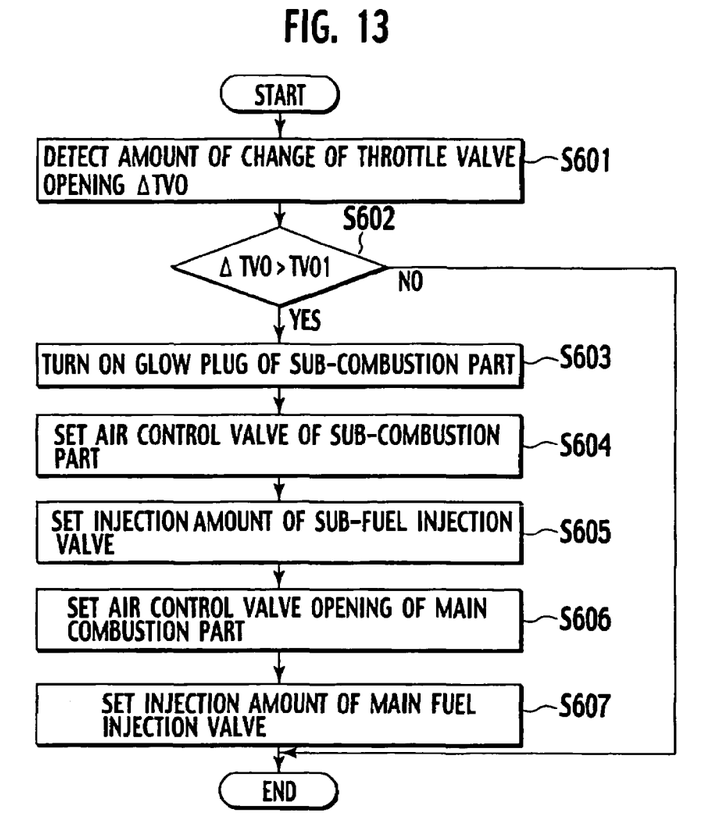
FIG. 13 is a flowchart showing the operations of embodiment 2 when load is increased in a fuel reforming operation.

Next, when the load is increased in the fuel reforming operation, if the heat introduced to the fuel pre-vaporization part 19 is insufficient due to a delayed response of the heat exchanger 21, the insufficient heat is compensated as described below. FIG. 13 is a flowchart showing the operations of embodiment 2 when the load is increased in the fuel reforming operation. Note that, in FIG. 13, the order of the operations in the flowchart is partially different from that described below.

The electronic control device detects an amount of change in throttle valve opening $\Delta TVO$ (Step S601), and determines whether or not this amount of change in throttle valve opening $\Delta TVO$ is larger than a predetermined amount of change TVO1 (Step S602). Here, if YES, the air control valve 13 and the sub-fuel injection valve 15 are operated and the air and the fuel, of which amounts are controlled, are introduced to the sub-combustion part 18 to be ignited by use of the glow plug for combustion thereof (Steps S603 to S605). Thereafter, by using both of the combustion gas and the air preheated by the heat exchanger 21, the increased fuel is vaporized in the fuel pre-vaporization part 19. The premixed lean air thus formed is introduced to the main combustion part 20a and the fuel having its amount controlled by the main fuel injection valve 16 and the air controlled for its amount to be an excess fuel by the air control valve 14 are supplied to the main combustion part 20a (Steps S606 and S607).

As described above, when the load is increased in the fuel reforming operation, the insufficient heat in the fuel pre-vaporization part 19 due to the delayed response of the heat exchanger 21 can be compensated by use of the combustion gas from the sub-combustion part 18. Thus, the increased fuel can be surely vaporized. As a result, transient response of the fuel reforming device can be improved.

Figure 14A:
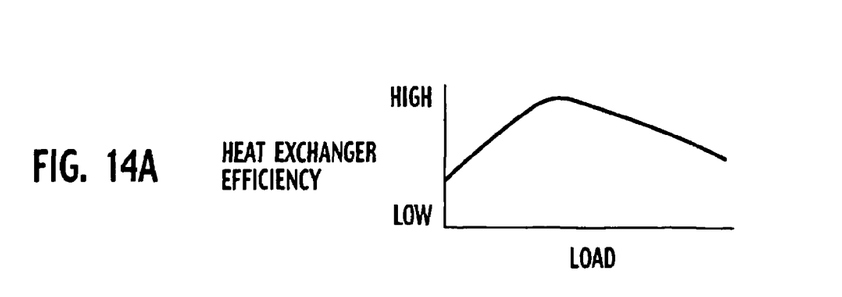
FIG. 14A is a graph showing a relationship between a reformer load and a heat exchanger efficiency.
Figure 14B:
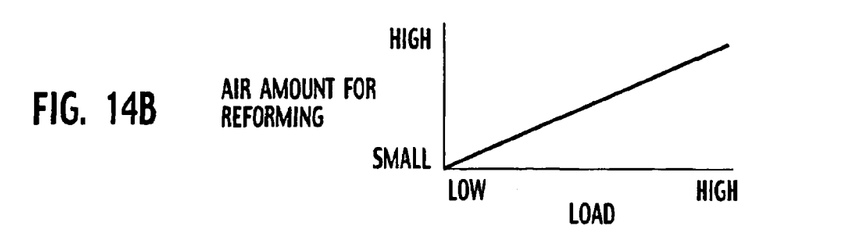
FIG. 14B is a graph showing a relationship between a reformer load and an air amount.

Moreover, as shown in FIGS. 14A and 14B, characteristics of the heat exchanger 21 are set so as to have the maximum heat exchange efficiency in a normal load area, for example in a load range of 30% to 50% of the maximum load. If the load is increased more than the above-described range, the following configuration may be adopted. Specifically, the air control valve 13 and the sub-fuel injection valve 15 are operated to introduce the air and the fuel to the sub-combustion part 18. Thereafter, the introduced air and fuel are ignited by use of the glow plug for combustion thereof and, by using both of the combustion gas and the air preheated by the heat exchanger 21, the increased fuel is vaporized in the fuel pre-vaporization part 19.

As described above, by setting the heat exchanger 21 so as to have the maximum heat exchange efficiency in the normal load area, thermal efficiency in the normal load area is improved. Moreover, when the load is increased, the insufficient heat in the fuel pre-vaporization part 19 can be compensated by use of the combustion gas from the sub-combustion part 18. Thus, the increased fuel can be surely vaporized.

As described above, by use of the fuel reforming system according to the present embodiments, particularly, exhaust performance, start-up performance, stopping performance and transient response of the fuel reforming device 30 can be improved with the following configuration. Specifically, in the combustor 6, predetermined amounts of fuel and air, which generate heat required in the fuel pre-vaporization part 19 in the start-up of the fuel cell system, are subjected to the lean combustion in the sub-combustion part 18, the fuel combusted in the main combustion part 20 is pre-vaporized in the fuel pre-vaporization part 19 by use of the combustion gas from the sub-combustion part 18 and the pre-vaporized fuel and the air are subjected to the premixed lean combustion in the main combustion part 20.

Note that, in the foregoing embodiments, the description was given of the example in which the fuel reforming device according to the present invention includes the reformer, the shift reactor and the selective oxidation reactor. However, the present invention can be also applied to other fuel reforming devices required to be heated to a temperature suitable for reactions in start-up.

The entire content of a Japanese Patent Application No. P2003-332160 with a filing date of Sep. 24, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

According to the present invention, in the start-up of the fuel cell system, a predetermined amount of fuel generating heat required in the fuel pre-vaporization part and air having a predetermined excess air ratio to the fuel are supplied to the sub-combustion part, and are subjected to the lean combustion. In this event, the predetermined amount of fuel is determined from the heat required for pre-vaporizing the fuel combusted in the main combustion part. In other words, the predetermined amount is determined from an amount of the pre-vaporized fuel with a proportional relation thereto. Moreover, the predetermined excess air ratio is determined so that the NOx generation amount or the combustion temperature related to the NOx generation amount is below a predetermined allowable range. By performing the combustion as described above, the NOx generation amount in the sub-combustion part can be sufficiently reduced. Generally, the NOx generation amount becomes extremely small at a combustion temperature of 900° C. or less. Thereafter, the fuel combusted in the main combustion part is pre-vaporized in the fuel pre-vaporization part by use of the combustion gas from the sub-combustion part, the pre-vaporized fuel and the air are mixed together at the predetermined excess air ratio and the premixed lean combustion is performed in the main combustion part. By performing the combustion as described above, the NOx generation amount in the main combustion part is extremely lowered. As a result, NOx emissions from the combustor as a total amount of NOx generated in the sub-combustion part and the main combustion part can be drastically reduced. Moreover, by distributing the high-temperature combustion gas thus generated within the fuel reforming device, smooth start-up of the fuel reforming device can be realized.

The invention claimed is:

1. A fuel reforming system of a fuel cell system, comprising:
  a combustor comprising:
    a main combustion part adapted to perform premixed lean combustion;
    a sub-combustion part provided upstream of the main combustion part, the sub-combustion part being adapted to perform a first lean combustion;
    a fuel pre-vaporization part between the main combustion part and the sub-combustion part, the fuel pre-vaporization part adapted to pre-vaporize fuel;
    a main fuel injection valve adapted to supply liquid fuel to the fuel pre-vaporization part; and
    a sub-fuel injection valve adapted to supply fuel to the sub-combustion part; and
  a fuel reforming device provided downstream of the combustor, the fuel reforming device comprising:

a fuel reformer adapted to generate hydrogen-rich gas by a steam reforming reaction of fuel and an oxidation reaction of fuel, wherein the fuel reforming system is adapted to, (a) subject, when the fuel cell system starts, predetermined amounts of fuel and air for generating heat required in the fuel pre-vaporization part to the first lean combustion in the sub-combustion part, (b) pre-vaporize fuel to be combusted in the main combustion part in the fuel pre-vaporization part by use of a first combustion gas generated by the first lean combustion in the sub-combustion part, (c) subject air and the pre-vaporized fuel obtained by the pre-vaporization in the fuel pre-vaporization part to a second lean combustion in the main combustion part, and (d) heat, with a second combustion gas generated by the second lean combustion in the main combustion part, the fuel reformer of the fuel reforming device.

2. A fuel reforming system according to claim 1, further comprising:

a heat exchanger provided downstream of the main combustion part, wherein the fuel reforming system is adapted to:
stop combustion in the sub-combustion part after the second lean combustion in the main combustion part is started,
preheat air by heat exchanged with the second combustion gas in the heat exchanger to obtain preheated air, and
pre-vaporize the fuel to be combusted in the main combustion part by introducing the preheated air into the fuel pre-vaporization part.

3. A fuel reforming system according to claim 1, wherein the sub-fuel injection valve is formed of an injection valve adapted to provide a flow rate lower than that of the main fuel injection valve.

4. A fuel reforming system according to claim 1, wherein the fuel reforming system is adapted to, in an idle operation of the fuel reforming device after start-up of the fuel cell system, perform the first lean combustion only in the sub-combustion part, and retain heat of the fuel reforming device by distributing the first combustion gas within the fuel reforming device.

5. A fuel reforming system according to claim 1, wherein the fuel reforming system is adapted to, when the fuel cell system is stopped, supply liquid fuel and air to the combustor, and purge the fuel reforming device by distributing the second combustion gas generated in the combustor within the fuel reforming device.

6. A fuel reforming system according to claim 1, wherein the fuel reforming system is adapted to, in a reforming operation after start-up of the fuel cell system, operate the main fuel injection valve as an injection valve which supplies fuel to be reformed to the fuel reformer.

7. A fuel reforming system according to claim 1, wherein the main combustion part is adapted to operate as a catalyst combustion part, and includes a catalyst adapted to combust fuel in an excess air state, and
wherein the fuel reforming system is adapted to, in a reforming operation after start-up of the fuel cell system, stop the second lean combustion in the main combustion part, set a ratio of fuel and air supplied to the main combustion part to a ratio of an excess fuel, and operate the catalyst combustion part as the fuel reformer.

8. A fuel reforming system according to claim 6, wherein the fuel reforming system is adapted to, in the reforming operation after start-up of the fuel cell system, pre-vaporize fuel for reforming in the fuel pre-vaporization part by use of the first combustion gas from the sub-combustion part.

9. A fuel reforming system according to claim 7, wherein a heat exchanger is provided downstream of the main combustion part, and wherein the fuel reforming system is adapted to:
preheat air by heat exchanged with reformed gas in the heat exchanger to obtain preheated air; and
in the reforming operation after start-up of the fuel cell system, stop the first and second lean combustions and pre-vaporize fuel for reforming by introducing the preheated air into the fuel pre-vaporization part.

10. A fuel reforming system according to claim 9, wherein the fuel reforming system is adapted to, when load in the reforming operation is increased, increase an amount of high-temperature gas introduced to the fuel pre-vaporization part by performing the first lean combustion in the sub-combustion part such that increased fuel for reforming is pre-vaporized.

11. A fuel reforming system according to claim 9, wherein the heat exchanger is adapted to have a maximum heat exchange efficiency in a normal load area, and
wherein the fuel reforming system is adapted to, when load is increased more than the normal load area, increase an amount of high-temperature gas introduced to the fuel pre-vaporization part by performing the first lean combustion in the sub-combustion part such that increased fuel for reforming is pre-vaporized.

12. A method of operating a fuel reforming system of a fuel cell system, the method comprising:
providing a combustor comprising:
a main combustion part adapted to perform premixed lean combustion;
a sub-combustion part provided upstream of the main combustion part, the sub-combustion part being adapted to perform lean combustion;
a fuel pre-vaporization part between the main combustion part and the sub-combustion part, the fuel pre-vaporization part adapted to pre-vaporize fuel;
a main fuel injection valve adapted to supply liquid fuel to the fuel pre-vaporization part; and
a sub-fuel injection valve adapted to supply fuel to the sub-combustion part;
providing a fuel reforming device downstream of the combustor, the fuel reforming device comprising:
a fuel reformer adapted to generate hydrogen-rich gas by a steam reforming reaction of fuel and an oxidation reaction of fuel;
first lean combusting predetermined amounts of fuel and air in the sub-combustion part to generate heat required in the fuel pre-vaporization part when the fuel cell system starts;
pre-vaporizing fuel to be combusted in the main combustion part in the fuel pre-vaporization part by use of first lean combustion gas generated by the first lean combustion in the sub-combustion part;
mixing air and pre-vaporized fuel obtained by the pre-vaporization in the fuel pre-vaporization part;
second lean combusting the mixture of the air and the pre-vaporized fuel in the main combustion part; and
heating the fuel reformer of the fuel reforming device by use of second combustion gas generated by the second lean combustion in the main combustion part.

* * * * *